(12) United States Patent
Abrosimov et al.

(10) Patent No.: US 12,007,787 B2
(45) Date of Patent: Jun. 11, 2024

(54) VEHICLE CONTROL SYSTEM

(71) Applicant: Westinghouse Air Brake Technologies Corporation, Pittsburgh, PA (US)

(72) Inventors: Igor Abrosimov, Germantown, MD (US); Osman Burak Onal, Germantown, MD (US); Brian Kurz, Germantown, MD (US)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 298 days.

(21) Appl. No.: 17/223,884

(22) Filed: Apr. 6, 2021

(65) Prior Publication Data

US 2021/0318694 A1 Oct. 14, 2021

Related U.S. Application Data

(60) Provisional application No. 63/009,194, filed on Apr. 13, 2020.

(51) Int. Cl.
| | |
|---|---|
| *G05D 1/00* | (2006.01) |
| *B60T 8/17* | (2006.01) |
| *G01C 21/34* | (2006.01) |
| *G08G 1/00* | (2006.01) |

(52) U.S. Cl.
CPC .......... *G05D 1/0293* (2013.01); *B60T 8/1705* (2013.01); *G01C 21/3407* (2013.01); *G05D 1/0212* (2013.01); *G08G 1/20* (2013.01); *B60T 8/1701* (2013.01)

(58) Field of Classification Search
CPC .. G05D 1/0293; G05D 1/0212; B60T 8/1705; B60T 8/1701; G01C 21/3407; G08G 1/20
See application file for complete search history.

(56) References Cited

U.S. PATENT DOCUMENTS

| | | | |
|---|---|---|---|
| 5,777,547 | A | 7/1998 | Waldrop |
| 5,867,404 | A | 2/1999 | Bryan |
| 6,044,698 | A | 4/2000 | Bryan |
| 6,526,339 | B1 | 2/2003 | Herzog et al. |

(Continued)

FOREIGN PATENT DOCUMENTS

| | | |
|---|---|---|
| EP | 3628529 A1 | 4/2020 |
| WO | 2013012516 A1 | 1/2013 |

OTHER PUBLICATIONS

Examination report No. 2 dated Apr. 11, 2022 for corresponding Australian patent application No. 2021202180 (6 pages).

(Continued)

*Primary Examiner* — Hussein Elchanti
(74) *Attorney, Agent, or Firm* — K&L Gates LLP (57) ABSTRACT

A vehicle control system and method receive vehicle makeup information from multiple vehicles in a multi-vehicle system. The vehicle makeup information represents one or more characteristics of the vehicles. The vehicle makeup information is received at a controlling vehicle of the vehicles in the multi-vehicle system that controls movement of the multi-vehicle system. The controlling vehicle also receives locations from location-determining devices respectively onboard the vehicles in the multi-vehicle system. The controlling vehicle controls operation of the multi-vehicle system using a combination of the vehicle makeup information received from the vehicles and the locations of the vehicles.

11 Claims, 6 Drawing Sheets

(56) References Cited

U.S. PATENT DOCUMENTS

| | | |
|---|---|---|
| 8,798,902 B2 | 8/2014 | Kumar et al. |
| 9,734,712 B1 | 8/2017 | Lai |
| 10,040,464 B2 | 8/2018 | Abrosimov et al. |
| 11,318,970 B2* | 5/2022 | Angel .................... B61L 25/025 |
| 2003/0183729 A1 | 10/2003 | Root et al. |
| 2003/0222180 A1 | 12/2003 | Hart et al. |
| 2011/0118913 A1* | 5/2011 | Pretorius ................... B61L 5/06 |
| | | 701/19 |
| 2011/0270475 A1* | 11/2011 | Brand ................ B61L 15/0027 |
| | | 701/19 |
| 2012/0277939 A1* | 11/2012 | Kumar ............... B61L 15/0072 |
| | | 701/19 |
| 2016/0047656 A1 | 2/2016 | Napolitano et al. |
| 2016/0185326 A1 | 6/2016 | Brooks et al. |
| 2016/0194015 A1 | 7/2016 | Seaton |
| 2018/0356814 A1 | 12/2018 | Brooks |
| 2019/0168728 A1 | 6/2019 | Venkatasubramanian et al. |
| 2019/0179034 A1 | 6/2019 | Tubergen |
| 2020/0122634 A1 | 4/2020 | Oswald et al. |
| 2020/0139945 A1* | 5/2020 | Schoenly ................ B61C 17/12 |
| 2020/0172133 A1 | 6/2020 | Abrosimov et al. |
| 2020/0207387 A1 | 7/2020 | Abrosimov et al. |
| 2021/0318694 A1* | 10/2021 | Abrosimov ............. B61L 27/40 |
| 2022/0024503 A1* | 1/2022 | Vrba .................... B61L 23/041 |

OTHER PUBLICATIONS

Examination report No. 1 dated Jan. 7, 2022 for corresponding Australian patent application No. 2021202180 (6 pages).
Examination Report No. 3 dated Jul. 28, 2022 for corresponding Australian patent application No. 2021202180 (5 bages).
Examination Report mailed Feb. 1, 2024 for corresponding Application No. 2023200071 ( 5 pages).

* cited by examiner

VEHICLE CONTROL SYSTEM

CROSS-REFERENCE TO RELATED APPLICATIONS

This application claims priority to U.S. Provisional Application No. 63/009,194, which was filed on 13 Apr. 2020, and the entire disclosure of which is incorporated herein by reference.

BACKGROUND

Technical Field

The subject matter described herein relates to systems and methods that monitor and control vehicles in a multi-vehicle system.

Discussion of Art

Some vehicle systems are formed from multiple vehicles that move together along routes. For example, rail vehicle systems (e.g., trains) may be formed from one or more locomotives and one or more rail cars. A locomotive can control operation of brakes onboard the other locomotives and rail cars, and may control throttle operation of the other locomotives (if any). The vehicle that controls the operation of other vehicles in the vehicle system (e.g., the lead vehicle) may need to know the location and/or sequence of the other vehicles in order to accurately and safely control operation of the other vehicles.

But, the location and/or sequence of the other vehicles in the vehicle system may be manually provided to the lead vehicle and/or may be based on a manifest. Either of these sources of information can be prone to error. This can cause the lead vehicle to not have the correct locations and/or sequence of the vehicles in the vehicle system. Consequently, the lead vehicle may not be able to safely and accurately control operation of the vehicle system.

BRIEF DESCRIPTION

In one embodiment, a method includes receiving vehicle makeup information from multiple vehicles in a multi-vehicle system. The vehicle makeup information represents one or more characteristics of the vehicles. The vehicle makeup information received at a controlling vehicle of the vehicles in the multi-vehicle system that controls movement of the multi-vehicle system. The method also includes receiving, at the controlling vehicle, locations from location-determining devices respectively onboard the vehicles in the multi-vehicle system, and controlling, with the controlling vehicle, operation of the multi-vehicle system using a combination of the vehicle makeup information received from the vehicles and the locations of the vehicles.

In one embodiment, a control system includes a controller configured to be disposed onboard a controlling vehicle of a multi-vehicle system. The controller is configured to receive vehicle makeup information from multiple other vehicles in the multi-vehicle system. The vehicle makeup information representing one or more characteristics of the other vehicles. The controller also is configured to receive locations from location-determining devices respectively onboard the other vehicles in the multi-vehicle system and to control operation of the multi-vehicle system using a combination of the vehicle makeup information received from the other vehicles and the locations of the other vehicles.

In one embodiment, a method includes receiving different location signals from different non-propulsion vehicles of a multi-vehicle system at a propulsion vehicle of the multi-vehicle system. The location signals indicate different locations of the non-propulsion vehicles. The method also includes determining a sequence of the non-propulsion vehicles in the multi-vehicle system based on the locations that are received, and controlling brakes onboard the non-propulsion vehicles based on the sequence of the non-propulsion vehicles.

BRIEF DESCRIPTION OF THE DRAWINGS

The inventive subject matter may be understood from reading the following description of non-limiting embodiments, with reference to the attached drawings, wherein below.

DETAILED DESCRIPTION

One or more embodiments of the inventive subject matter described herein provide control systems and methods that monitor locations of vehicles in a multi-vehicle system and control operation of these vehicles based on the locations that are monitored. The vehicles may include location determining devices that report the locations of the vehicles to a lead vehicle in the same vehicle system. The lead vehicle receives this information and can control the vehicle system in a variety of ways based on this information, as described herein. For example, each vehicle can be equipped with a global positioning system (GPS) receiver and can send GPS data to a head end unit (e.g., the lead vehicle) along with other vehicle status information, such as whether the vehicle is empty or carrying cargo, whether a brake (e.g., a hand brake) is engaged, etc. The location of each vehicle can be used for multiple purposes, such as vehicle sequencing (e.g., determining the sequence or order of vehicles in the vehicle system), updating or monitoring a vehicle database, travel optimization activities, mitigation of communication crosstalk, etc.

In operation, the head end unit can initiate sequencing by sending a broadcast message to other vehicles. This message can direct or request that the vehicles report the presence of the vehicles. The vehicles can respond to the message from the head end unit with a message that includes the location of the respective vehicle, and optionally other status information, identifying information, etc. The locations can be reported as absolute locations (e.g., locations relative to a fixed reference point, such as geographic coordinates) and/ or relative locations (e.g., locations relative to a moving reference point, such as a distance from the head end unit, a distance from another vehicle, etc.). The head end unit can then enumerate the vehicles based on the reported locations and route geographic properties (the layout or location of a route obtained from a route database) corresponding to the route segment identified or disposed below the vehicle locations.

This technique is more expedient and can be used as a reliable primary method in some locations and/or as secondary method to partially validate traditional sequencing (e.g., when some vehicles have difficulty connecting to an external communication device, such as a satellite). The locations of the vehicles can be an additional filtering criteria for crosstalk mitigation. The vehicles can use the locations reported by the vehicles to determine whether other signals or information is sent from a vehicle in the same vehicle system or a nearby vehicle that is not in the same vehicle system as the receiver of the signals or information. For example, responses from a broadcast message can receive responses from many vehicles due to the wireless communication range of the vehicle that sends the broadcast message. The head end unit (or other vehicle) that sent the broadcast message can filter or disregard those responses that are received from vehicles that report locations that do not correspond to the same vehicle system or route segment that the head end unit is located in.

While one or more embodiments of the inventive subject matter are described as relating to rail vehicles and rail vehicle systems (e.g., trains, locomotives, rail cars, etc.), not all embodiments of the inventive subject matter are limited to rail vehicles. One or more embodiments of the inventive subject matter relate to other vehicle systems, such as vehicle systems formed entirely or partially from automobiles, transit vehicles, agricultural vehicles, mining vehicles, marine vessels, or the like.

Figure 1:
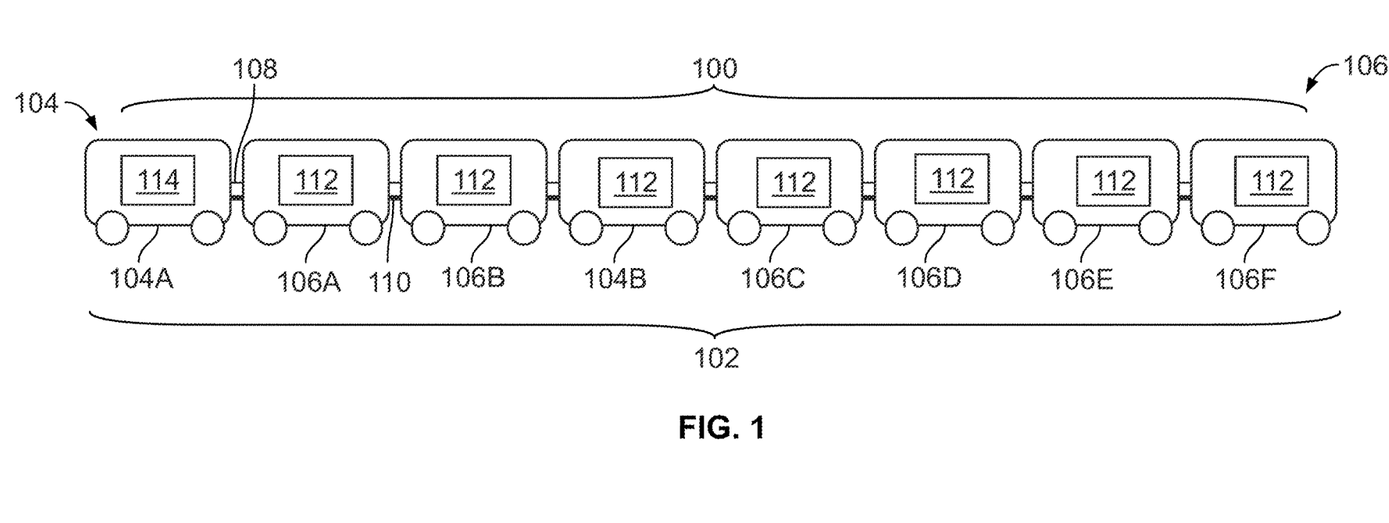
FIG. 1 illustrates one example of a vehicle control system.

FIG. 1 illustrates one example of a vehicle control system 100. The vehicle control system may be disposed onboard a multi-vehicle system 102 formed from plural vehicles 104, 106. The vehicles in the vehicle system are mechanically and/or fluidly coupled with each other in the illustrated embodiment. For example, the vehicles in the vehicle system may be mechanically coupled by couplers 108 and fluidly coupled with each other by a brake pipe 110 of an air brake system onboard the vehicle system. Alternatively, two or more of the vehicles in the vehicle system may not be coupled with each other. For example, the vehicles may not be mechanically or fluidly coupled with each other, but may be communicatively and/or logically coupled with each other so that the vehicles can communicate with each other as the vehicles move. This allows the vehicles to coordinate movements with each other and move along routes together as a vehicle system (e.g., as a convoy).

The vehicles 104 (e.g., vehicles 104A, 104B) can be propulsion-generating vehicles that operate to move the vehicle system along routes (e.g., tracks, roads, paths, etc.). For example, the propulsion-generating vehicles can be locomotives, automobiles, trucks, tractors, boats, or the like. The vehicles 106 (e.g., vehicles 106A-F) can be non-propulsion-generating vehicles that are moved by the propulsion-generating vehicles. For example, the non-propulsion-generating vehicles can represent rail cars, trailers, barges, etc. The number and arrangement of the vehicles shown in FIG. 1 is provided as one example. The vehicle 104A may be referred to as a controlling vehicle, a lead vehicle, or a head end unit that communicates with the other vehicles to control operation of the vehicles. For example, the controlling vehicle can send (e.g., broadcast and/or transmit) control signals to the other propulsion-generating vehicle(s) to direct throttle settings and/or brake settings of the other propulsion-generating vehicle(s). As another example, the controlling vehicle can send control signals to the non-propulsion-generating vehicles to individually direct brake settings of the non-propulsion-generating vehicles. While the controlling vehicle or head end unit is disposed at the leading end (relative to a direction of travel) of the vehicle system shown in FIG. 1, the controlling vehicle may be disposed in another position in the vehicle system.

The control system includes location determining devices 112 disposed onboard the vehicles in the vehicle system. The location determining devices determine individual locations of the vehicles and that communicate the locations to the controlling vehicle. These locations can be absolute locations (e.g., geographic coordinates) and/or relative locations (e.g., distances from another vehicle in the vehicle system). The vehicles communicate the locations of the vehicles and may communicate vehicle makeup information to the controlling vehicle. The makeup information can include characteristics of the vehicles. These characteristics can include the status or the health of components onboard the vehicles, such as the state or health of a brake or brake control device onboard the vehicle, the presence of cargo onboard the vehicle, etc.

The control system includes a controller 114 onboard the controlling vehicle. The controller uses the makeup information and the locations reported by the vehicles using a combination of the makeup information and the locations of the vehicles. The controller can represent hardware circuitry that includes and/or is connected with one or more processors (e.g., one or more microprocessors, one or more field programmable gate arrays, one or more integrated circuits, or the like). As one example, the controller can determine the sequence of the vehicles in the vehicle system. The sequence can be the order in which the vehicles are positioned relative to each other in the vehicle system. In the example shown in FIG. 1, the controller can receive the locations from the other vehicles and determine that the vehicle 106A is second in the vehicle sequence of the vehicle system, the vehicle 106B is third in the vehicle sequence, the vehicle 104B is fourth in the vehicle sequence, and so on. The sequence of the vehicles can be used by the controller to control movement of the vehicle system.

For example, based on the order of the vehicles, the controller can direct some vehicles to engage the brake onboard the vehicles, direct other vehicles to engage the brakes at different levels or settings, direct other vehicles to generate propulsion or thrust, direct other vehicles to generate another amount of propulsion or thrust, etc. If the vehicle system is crossing a peak in the route, the controller can use the locations of the vehicles to determine which vehicles to direct to brake (e.g., the vehicles on the downhill grade or slope on one side of the peak) and which vehicles to direct to generate propulsion (e.g., the vehicles on the uphill grade or slope on the other side of the peak).

As another example, the controller can examine the locations of the vehicles and direct different vehicles to brake or generate propulsion to control slack in the couplers, change the distance between neighboring vehicles, or the like. Stated differently, responsive to the controller determining that neighboring vehicles or neighboring segments of several vehicles in the same vehicle system are farther apart than a threshold distance, the controller can determine that the coupler(s) between the vehicles or vehicle segments are stretched or in a stretched state. The controller can then direct the vehicles or the vehicles in the segment ahead of the stretched coupler(s) to reduce throttle settings, engage brakes, or otherwise slow down. The controller also may direct the vehicles or the vehicles in the segment behind the stretched coupler(s) to increase throttle settings, disengage brakes, or otherwise speed up. As another example, responsive to the controller determining that neighboring vehicles or neighboring segments of several vehicles in the same vehicle system are closer together than another threshold distance, the controller can determine that the coupler(s) between the vehicles or vehicle segments are compressed or in a compressed state. The controller can then direct the vehicles or the vehicles in the segment ahead of the compressed coupler(s) to increase throttle settings, disengage brakes, or otherwise speed up. The controller also may direct the vehicles or the vehicles in the segment ahead of the compressed coupler(s) to decrease throttle settings, engage brakes, or otherwise slow down.

Figure 2:
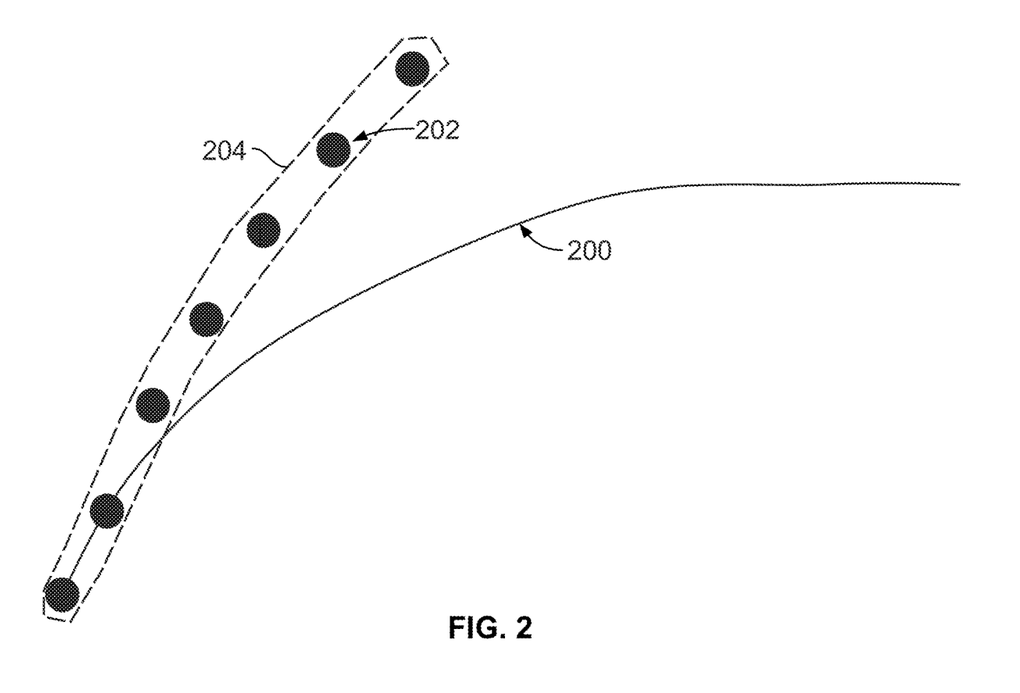
FIG. 2 illustrates an example of a stored layout of a route segment compared with reported locations of the vehicles in the vehicle system shown in FIG. 1.
Figure 3:
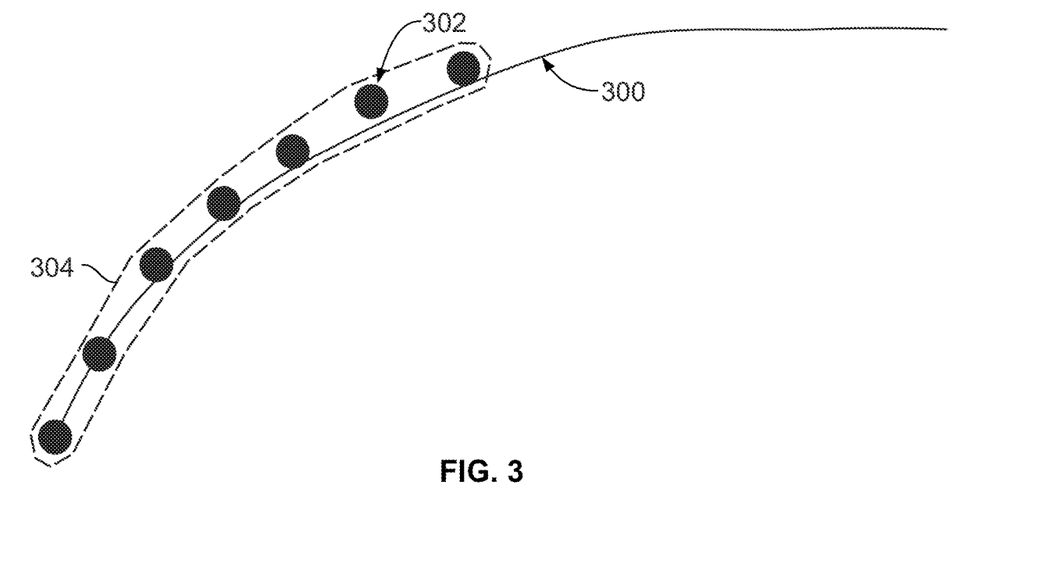
FIG. 3 illustrates another example of a stored layout of a route segment compared with reported locations of the vehicles in the vehicle system shown in FIG. 1.

FIGS. 2 and 3 illustrate examples of stored layouts 200, 300 of a route segment compared with reported locations 202, 302 of the vehicles 104, 106 in the vehicle system 102 (shown in FIG. 1). The controller 114 (shown in FIG. 1) can use the reported locations of the vehicles to verify the contents of a route database. A tangible and non-transitory computer readable medium, such as a computer memory (e.g., a computer hard drive, optical disc, or the like) can be onboard the vehicle system and can store layouts of routes. The layouts may be geographic locations of routes, curvatures of routes, intersections between routes, or the like. The controller and/or operator onboard the vehicle system can use the information stored in the route database to control movement of the vehicle system.

The controller can use the self-reported locations of the vehicles in the vehicle system to determine a layout 204, 304 of the vehicle system. This vehicle system layout may be a combination or set of the locations of the vehicles. The controller can compare the vehicle system layout with the stored layout of the route segment. If the vehicle locations represented by the vehicle system layout correspond with the stored layout of the route, then the controller can verify that the stored layout of the route is accurate. But, if the vehicle locations represented by the vehicle system layout do not correspond with the stored layout of the route, then the controller can determine that the stored layout of the route is not accurate.

For example, the locations of the vehicles in the vehicle system layout shown in FIG. 2 are not located over or within a threshold distance (e.g., ten meters) of the stored route layout. The stored route layout has a curve with a smaller radius of curvature than a path along which the vehicle locations extends along. The controller can determine that the route database is not accurate for the illustrated route segment. The controller can modify the route database (to change the stored layout to match or more closely match the vehicle system layout), request that the route database be modified, or the like, based on these differences. In contrast, the locations of the vehicles in the vehicle system layout shown in FIG. 3 are located over or within the threshold distance of the stored route layout. The controller can determine that the route database is accurate for the illustrated route segment.

Figure 4:
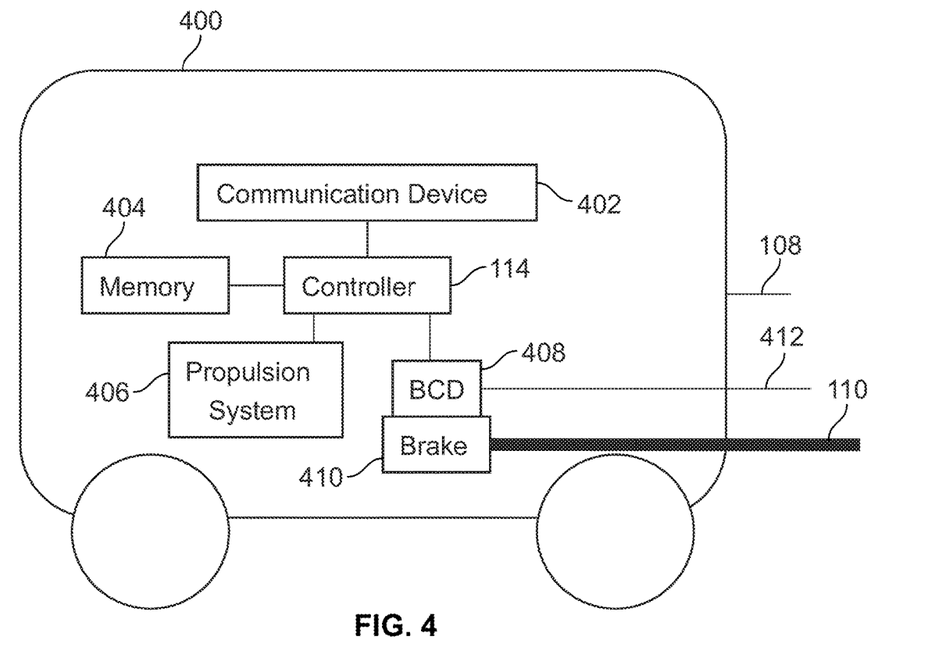
FIG. 4 illustrates one example of a propulsion-generating vehicle.

FIG. 4 illustrates one example of a propulsion-generating vehicle 400. The propulsion-generating vehicle can represent one or more of the vehicles 104 shown in FIG. 1. The propulsion-generating vehicle includes the controller 114 and a communication device 402 that communicates with the other vehicles in the vehicle system and may communicate with vehicles or other systems that are not in the same vehicle system as the propulsion-generating vehicle. The communication device can represent transceiving circuitry, one or more antennas, modems, or the like, that communicate via wired and/or wireless pathways. A memory 404 can represent the tangible and non-transitory computer readable storage medium described above. For example, the memory may include or represent the route database. A propulsion system 406 represents one or more engines, generators, alternators, motors, or the like, that operate to propel the propulsion-generating vehicle.

A brake control device 408 ("BCD" in FIG. 4) represents hardware circuitry that controls a brake 410 of the propulsion-generating vehicle. For example, the brake can represent an air brake that is controlled by the brake control device. The brake control device can represent an individually addressable electronically controlled pneumatic (ECP) device that controls the brake to engage or release. The brake can be fluidly coupled with the brake pipe 110 that extends along the length of the vehicle system. The brake control device can direct the air brake to reduce pressure in a brake cylinder to engage the brake or can control a valve to direct air from the brake pipe into the brake cylinder to release the brake. The brake control device can be coupled with a cable 412 that extends along part or all of the vehicle system. The cable can represent a train line or other conductive pathway through which control signals are communicated. Control signals can be communicated from the controller to the brake control devices onboard other vehicles in the vehicle system via the cable. These control signals may direct the brake control devices on the vehicles to engage or release the respective brakes. The control signals can be individually addressable to instruct the brake control devices onboard different vehicles to engage or release the brakes to different amounts, settings, etc. at the same time.

Figure 5:
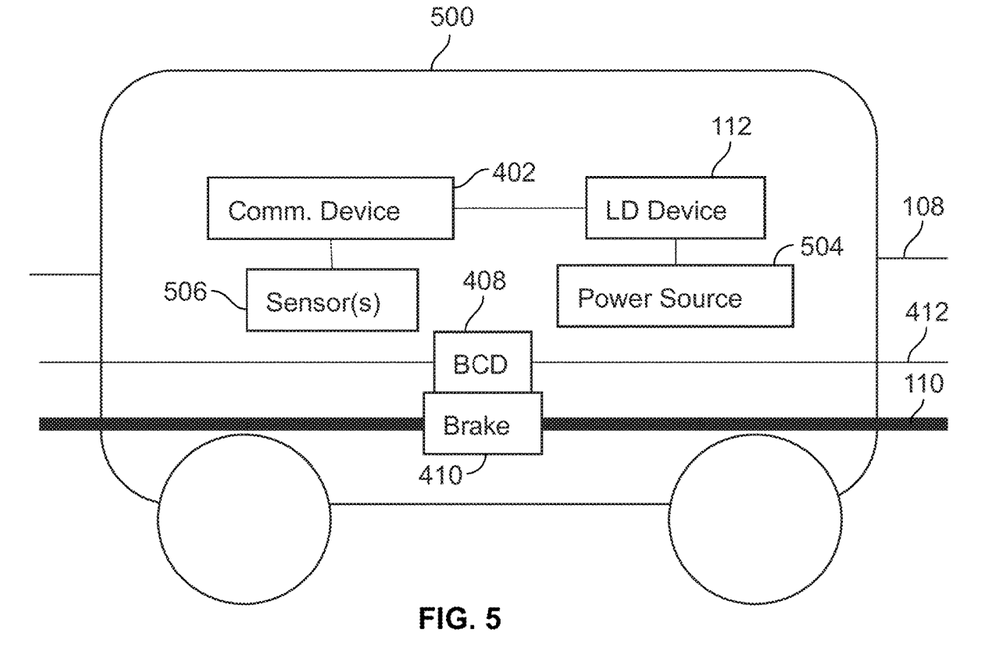
FIG. 5 illustrates one example of a non-propulsion-generating vehicle.

FIG. 5 illustrates one example of a non-propulsion-generating vehicle 500. The non-propulsion-generating vehicle can represent one or more of the vehicles 106 shown in FIG. 1. The non-propulsion-generating vehicle includes the communication device 402 described above to allow the non-propulsion-generating vehicle to communicate with the controlling vehicle (and, optionally, other vehicles). The non-propulsion-generating vehicle includes the brake control device 408 for controlling the brake 410 of the non-propulsion-generating vehicle.

The non-propulsion-generating vehicle includes a location determining device 112 ("LD Device" in FIG. 5) that determines the location of the non-propulsion-generating vehicle. The location determining device can represent a GPS receiver. Optionally, the location determining device can represent a wireless triangulation device, a dead reckoning system, or the like, that operates to output a location of the location determining device and the non-propulsion-generating vehicle. Although not shown in FIG. 4, the vehicle 104 also may include a location determining device.

A power source 504 can provide electric current to the location determining device and/or other components of the non-propulsion-generating vehicle. The power source can represent one or more batteries, capacitors, or the like. Optionally, the location determining device can be powered by an off-board source, such as a power source onboard another vehicle in the same vehicle system.

A sensor 506 represents one or more devices that measure or detect one or more characteristics of the non-propulsion-generating vehicle. The sensor can represent one or more pressure sensors that measure pressures in the brake pipe, in the brake cylinder of the brake, in one or more brake reservoirs, etc. Optionally, the sensor can represent a temperature sensor that measures temperatures of the non-propulsion-generating vehicle. The communication device can send signals to the controlling vehicle that include the location of the vehicle as determined by the location determining device, the characteristic(s) monitored by the sensor, etc.

The controller of the controlling vehicle can use the self-reported locations of the vehicles in the vehicle system to determine which brake control devices in the vehicle system to direct to engage brakes, what settings to engage the brakes, which brake control devices in the vehicle system to direct to release brakes, throttle settings of propulsion-generating vehicles, etc. The brake control devices can be individually addressed by control signals sent by the controller. For example, each brake control device may have a unique identifier or address. The controller can broadcast and/or transmit control signals that include the identifier or address of one or more brake control devices to individually control the brakes in the vehicle system. For example, the controller can broadcast a signal that directs the brake control device of the vehicle 106A to engage the brake of the vehicle 106A to a first setting (that generates a first braking effort), directs the brake control device of the vehicle 106B to concurrently or simultaneously engage the brake of the vehicle 106B to a different, second first setting (that generates a different, second braking effort), and so on. The controller can determine which brakes to control based on the locations of the vehicles, as described above.

The controller can determine health states of the brakes onboard the vehicles based on the characteristics that are communicated by the sensors of the vehicles. For example, the controller can determine whether pressures in the brake system are too high or too low, whether communication with a brake control device is interrupted (potentially indicating failure of the brake control device), etc., and may determine that the brake has failed or is no longer fully functional. The controller can control operation of one or more other brakes in the vehicle system based on the health state that is determined. For example, responsive to determining that a brake or brake control device of the vehicle 106D is not operating properly, the controller can individually direct the brakes of the vehicles near the vehicle 106D to engage. The controller can instruct the brake control devices of the vehicles 106C, 106E to engage the corresponding brakes or to engage the corresponding brakes to an increased setting to make up for the decreased health or state of the brake of the vehicle 106D.

The controller can select the brake control devices to engage the brakes or to change settings of the brakes based on how close the vehicles are to the vehicle having the decreased health or state. For example, responsive to determining that the brake or brake control device of the vehicle 106D is not operating properly, the controller can determine which other vehicles are within a threshold distance (e.g., the length of three vehicles, fifty meters, etc.) of the vehicle 106D. The controller can determine which vehicles are within the threshold distance of the vehicle 106D based on the self-reported locations from the vehicles. The controller can then direct those vehicles that report locations within the threshold distance to the vehicle 106D to engage the respective brakes of those vehicles.

Figure 6:
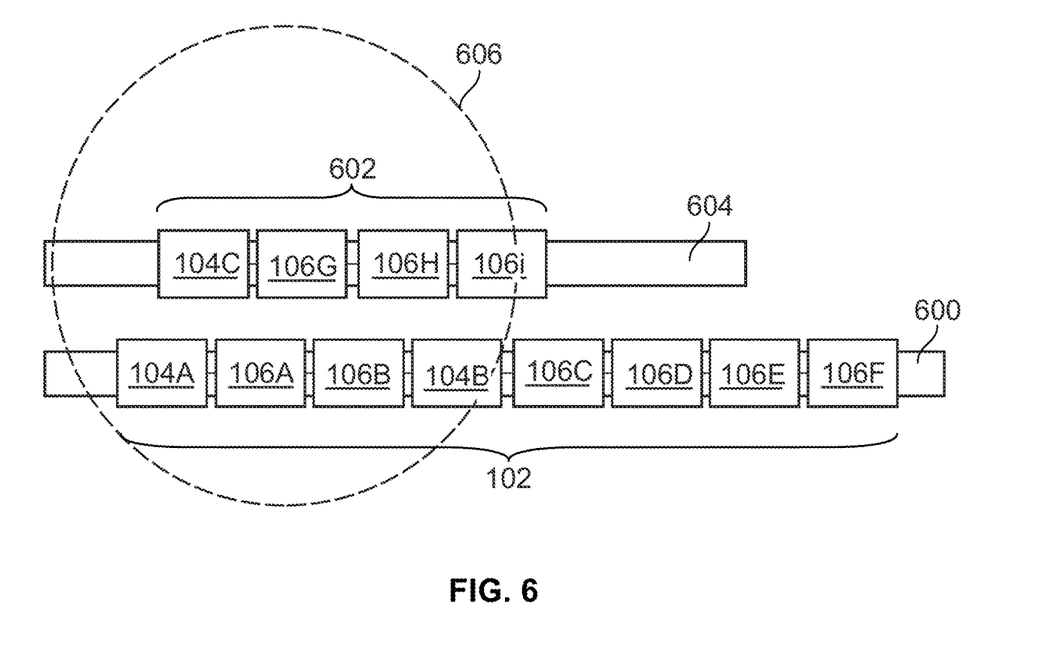
FIG. 6 illustrates another view of the vehicle system shown in FIG. 1.

FIG. 6 illustrates another view of the vehicle system 102 shown in FIG. 1. The vehicle system 102 is on a first route 600 and a nearby vehicle system 602 is on a different, second route 604. The nearby vehicle system 602 can be formed from one or more other vehicles 104, 106, such as vehicles 104C and vehicles 106G-I.

The controller of the vehicle system 102 can use the self-reported locations of the vehicles 104, 106 in the vehicle system 102 to reduce or eliminate the impact of cross-talk between the vehicle systems 102, 602. The vehicle systems 102, 602 may be sufficiently close to each other that the controller vehicle 104A in the vehicle system 102 is within a wireless communication range 606 of a vehicle in the vehicle system 602 (e.g., the vehicle 106G). As a result, the controller vehicle 104A may receive communications sent by the vehicle 106G (intended for the controller vehicle 104C of the vehicle system 602).

The controller can use the self-reported locations of the vehicles (other than the controlling vehicle) to determine whether a signal received from one or more of the vehicles in the same vehicle system. For example, the controller can examine a signal that is wirelessly received from another vehicle. This signal can include the location of the vehicle sending the signal, and may include other information (e.g., sensed characteristics, a current brake setting, etc.). The controller can examine the location of the vehicle that sent the signal to determine whether the location indicates that the vehicle is on the same route 600 as the controlling vehicle.

For example, the controller onboard the vehicle 104A can examine a signal received from the vehicle 106G. The controller examines the self-reported location of the vehicle 106G and determines that the vehicle 106G is located on a different route 604 than the vehicle system 102. The controller can make this determination based on route layout information for the routes 600, 604 that is stored in the memory 404. The controller can then disregard the signal received from the vehicle 106G. The controller can disregard the signal by not using information contained in the signal to control or change movement of the vehicle system 102. This reduces or eliminates the impact on cross-talk between the vehicle systems 102, 602.

In contrast, the controller onboard the vehicle 104A can examine a signal received from the vehicle 106B, examine the self-reported location of the vehicle 106B, examine the route layout information for the route 600, and determines that the vehicle 106B is located in the same route 600 as the vehicle system 102. The controller also can determine that the vehicle 106B is within a threshold distance (e.g., the length of the vehicle system 102) based on the self-reported location of the vehicle 106B) to verify that the vehicle 106B is in the same vehicle system 102 as the controller. The controller can then use the information included in the received signal to control or change movement of the vehicle system 102, as described herein.

Figure 7:
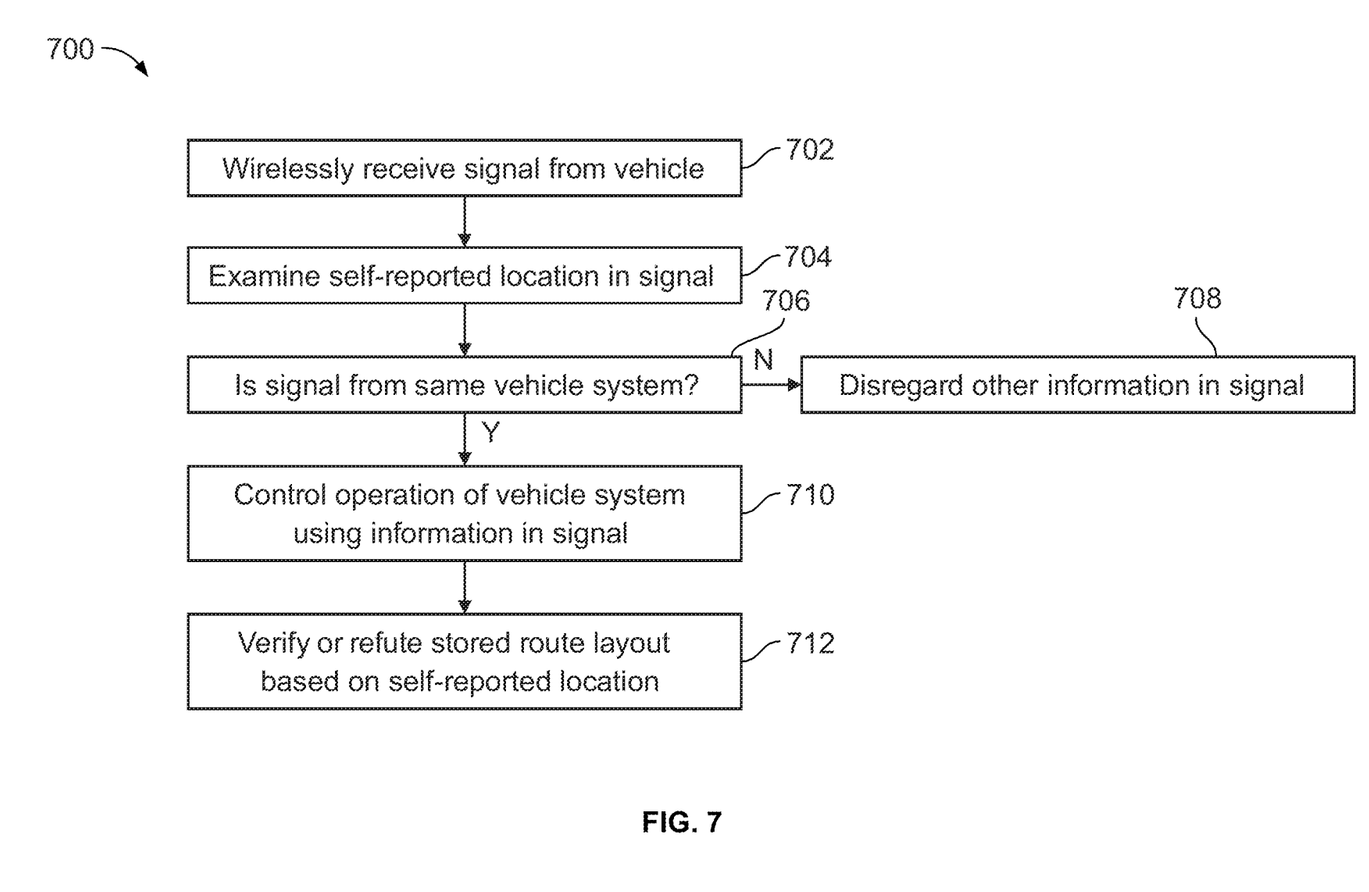
FIG. 7 illustrates a flowchart of one example of a method for controlling operation of a vehicle system.

FIG. 7 illustrates a flowchart of one example of a method 700 for controlling operation of a vehicle system. The method 700 can represent operations performed by the controller of the vehicle system. At 702, a signal is wirelessly received from another vehicle. For example, the communication device can wirelessly receive a signal sent from another vehicle. The received signal can include a self-reported location of the vehicle from which the signal originated. At 704, the location received in the signal is examined. For example, the controller can determine how far the received location is from the vehicle in which the controller is located, can determine whether the received location is on a route that the vehicle in which the controller is located also is on, etc. at 706, a determination is made as to whether the signal was received from a vehicle that is in the same vehicle system as the controller. For example, the controller can determine whether the received location is farther than a threshold distance corresponding to the length of the vehicle system. If the received location is farther than this threshold distance, then the controller can determine that the vehicle that sent the signal is not in the same vehicle system as the controller. If the received location is not farther than this threshold distance, then the controller may determine that the vehicle that sent the signal is in the same vehicle system as the controller. As an additional or alternative check, the controller can determine whether the received location is on the same route as the vehicle system of the controller. The controller can compare the received location to locations of the route on which the vehicle system is disposed. If the received location is not on the layout of the route, then the controller can determine that the vehicle that sent the signal is not in the same vehicle system as the controller. If the received location is on the layout of the route, then the controller may determine that the vehicle that sent the signal is in the same vehicle system as the controller.

If the signal is identified as being sent from a vehicle in the same vehicle system as the controller, then flow of the method 700 can proceed toward 710. But, if the signal is identified as being sent from a vehicle that is not in the same vehicle system as the controller, then flow of the method 700 can proceed toward 708.

At 708, the information included in the signal is disregarded. For example, the controller may ignore or may not change operation of the vehicle system based on any additional information contained in the received signal. The information can be ignored by the controller to prevent the controller from changing movement of the vehicle system due to cross-talk with another vehicle system. Flow of the method 700 can terminate or return to one or more previous operations (e.g., 702).

At 710, operation of the vehicle system can be controlled based on information contained in the received signal. For example, after verifying that the signal is received from a vehicle in the same vehicle system as the controller, the controller can determine a sequence of the vehicles in the vehicle system, individually change or otherwise engage brakes, change throttle settings, or the like, using information included in the signal, as described herein.

At 712, a route layout stored in a memory can be verified or refuted based on the location included in the signal. For example, the controller can compare self-reported locations that are determined to be in the same vehicle system and compare these locations to a stored layout of the route (on which the vehicle system is traveling). If the locations differ from the stored route layout, then the controller can determine that the stored layout of the route is incorrect. The controller optionally can modify the stored route layout to correspond to the locations of the vehicles or may generate an alert or request to update the stored route layout. If the locations do not differ from the stored route layout, then the controller can determine that the stored layout of the route is correct. Flow of the method 700 can terminate or return toward one or more other operations (e.g., 702).

In one embodiment, a method includes receiving vehicle makeup information from multiple vehicles in a multi-vehicle system. The vehicle makeup information represents one or more characteristics of the vehicles. The vehicle makeup information received at a controlling vehicle of the vehicles in the multi-vehicle system that controls movement of the multi-vehicle system. The method also includes receiving, at the controlling vehicle, locations from location-determining devices respectively onboard the vehicles in the multi-vehicle system, and controlling, with the controlling vehicle, operation of the multi-vehicle system using a combination of the vehicle makeup information received from the vehicles and the locations of the vehicles.

Optionally, the method also can include determining a sequence of the vehicles in the multi-vehicle system using the locations of the vehicles that are received at the controlling vehicle. The operation of the multi-vehicle system can be controlled using the vehicle makeup information and the sequence of the vehicles.

Optionally, the method also includes determining a shape of a path over which the multi-vehicle system extends using the locations of the vehicles that are received, comparing the shape of the path over which the multi-vehicle system extends with a shape of a route that is stored in a route database, and one or more of verifying or modifying the shape of the route that is stored in the route database based on comparing the shape of the path with the shape of the route.

Optionally, the vehicles include individually addressable brake control devices configured to be controlled by the controlling vehicle. The operation of the multi-vehicle system can be controlled by controlling one or more of the brake control devices based on the locations of the vehicles that are received.

Optionally, the method can include determining a state of a first brake in the multi-vehicle system. At least a second brake in the multi-vehicle system can be controlled based on the state of the first brake and based on the location of at least the second brake.

Optionally, the first brake and the second brake are disposed onboard different vehicles of the vehicles in the multi-vehicle system.

Optionally, the first brake is disposed onboard a first vehicle of the vehicles in the multi-vehicle system and the state that is determined indicates that the first brake has failed. The method also can include determining that the second brake is disposed onboard a second vehicle of the vehicles in the multi-vehicle system that is within a threshold distance from the first vehicle, and changing engagement of the second brake based on the state of the first brake and the second vehicle being within the threshold distance from the first vehicle.

Optionally, the method also can include receiving a signal at the controlling vehicle from a first vehicle in the multi-vehicle system or a second vehicle that is not in the multi-vehicle system, and determining whether the location of the first vehicle or the second vehicle that sent the signal is located on a first route segment that the controlling vehicle also is located. The operation of the multi-vehicle system can be controlled based on the signal that is received responsive to determining that the signal is received from the first vehicle that is in the multi-vehicle system and that the signal is not received from the second vehicle that is not in the multi-vehicle system.

Optionally, the method can include receiving a signal at the controlling vehicle from a first vehicle in the multi-vehicle system or a second vehicle that is not in the multi-vehicle system, and determining whether the location of the first vehicle or the second vehicle that sent the signal is located on a first route segment that the controlling vehicle also is located. The operation of the multi-vehicle system may not be controlled based on the signal that is received responsive to determining that the signal is received from the second vehicle that is not in the multi-vehicle system and that the signal is not received from the first vehicle that is in the multi-vehicle system.

In one embodiment, a control system includes a controller configured to be disposed onboard a controlling vehicle of a multi-vehicle system. The controller is configured to receive vehicle makeup information from multiple other vehicles in the multi-vehicle system. The vehicle makeup information representing one or more characteristics of the other vehicles. The controller also is configured to receive locations from location-determining devices respectively onboard the other vehicles in the multi-vehicle system and to control operation of the multi-vehicle system using a combination of the vehicle makeup information received from the other vehicles and the locations of the other vehicles.

Optionally, the controller also is configured to determine a sequence of the vehicles in the multi-vehicle system using the locations of the vehicles that are received at the controlling vehicle. The controller is configured to control the operation of the multi-vehicle system using the vehicle makeup information and the sequence of the vehicles.

Optionally, the controller is configured to determine a shape of a path over which the multi-vehicle system extends using the locations of the other vehicles that are received, compare the shape of the path over which the multi-vehicle system extends with a shape of a route that is stored in a route database, and one or more of verify or modify the shape of the route that is stored in the route database based on comparing the shape of the path with the shape of the route.

Optionally, the other vehicles include individually addressable brakes configured to be controlled by the controlling vehicle. The controller can be configured to control the operation of the multi-vehicle system by controlling one or more of the brakes based on the locations of the other vehicles that are received.

Optionally, the controller can be configured to determine a state of a first brake of the brakes in the multi-vehicle system. The controller also can be configured to control at least a second brake of the brakes in the multi-vehicle system based on the location of the first brake and based on the location of at least the second brake.

Optionally, the first brake is disposed onboard a first vehicle of the other vehicles in the multi-vehicle system and the state that is determined indicates that the first brake has failed.

Optionally, the controller is configured to determine that the second brake is disposed onboard a second vehicle of the other vehicles in the multi-vehicle system that is within a threshold distance from the first vehicle and to change engagement of the second brake based on the state of the first brake and the second vehicle being within the threshold distance from the first vehicle.

Optionally, the controller is configured to receive a signal at the controlling vehicle from a first vehicle in the multi-vehicle system or a second vehicle that is not in the multi-vehicle system and determine whether the location of the first vehicle or the second vehicle that sent the signal is located on a first route segment that the controlling vehicle also is located. The controller can be configured to control the operation of the multi-vehicle system based on the signal that is received responsive to determining that the signal is received from the first vehicle that is in the multi-vehicle system and that the signal is not received from the second vehicle that is not in the multi-vehicle system.

In one embodiment, a method includes receiving different location signals from different non-propulsion vehicles of a multi-vehicle system at a propulsion vehicle of the multi-vehicle system. The location signals indicate different locations of the non-propulsion vehicles. The method also includes determining a sequence of the non-propulsion vehicles in the multi-vehicle system based on the locations that are received, and controlling brakes onboard the non-propulsion vehicles based on the sequence of the non-propulsion vehicles.

Optionally, controlling the brakes includes individually engaging a first brake of the brakes responsive to at least a second brake of the brakes failing. The first brake can be engaged based on the location of the non-propulsion vehicle that includes the first brake.

Optionally, controlling the brakes includes disregarding a signal received by a controller onboard the propulsion vehicle from a second non-propulsion vehicle that is not included in the multi-vehicle system based on a second location signal received from the second non-propulsion vehicle.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   receiving vehicle makeup information from multiple vehicles in a multi-vehicle system, the vehicle makeup information representing one or more characteristics of the vehicles, the vehicle makeup information received at a controlling vehicle of the vehicles in the multi-vehicle system that controls movement of the multi-vehicle system;
   receiving, at the controlling vehicle, locations from location-determining devices respectively onboard the vehicles in the multi-vehicle system;
   determining a sequence of the vehicles in the multi-vehicle system using the locations of the vehicles that are received at the controlling vehicle; and
   controlling, with the controlling vehicle, operation of the multi-vehicle system using a combination of the vehicle makeup information received from the vehicles, the locations of the vehicles, and the sequence of the vehicles;
   determining a state of a first brake in the multi-vehicle system, wherein at least a second brake in the multi-vehicle system is controlled based on the state of the first brake and based on the location of at least the second brake, wherein the first brake is disposed onboard a first vehicle of the vehicles in the multi-vehicle system and the state that is determined indicates that the first brake has failed, and further comprising: determining that the second brake is disposed onboard a second vehicle of the vehicles in the multi-vehicle system that is within a threshold distance from the first vehicle; and changing engagement of the second brake based on the state of the first brake and the second vehicle being within the threshold distance from the first vehicle.

2. The method of claim 1, wherein the vehicles include individually addressable brake control devices configured to be controlled by the controlling vehicle, wherein controlling the operation of the multi-vehicle system includes controlling one or more of the brake control devices based on the sequence of the vehicles.

3. The method of claim 1, further comprising:
   receiving a signal at the controlling vehicle from a first vehicle in the multi-vehicle system or a second vehicle that is not in the multi-vehicle system; and
   determining whether the location of the first vehicle or the second vehicle that sent the signal is located on a first route segment that the controlling vehicle also is located,
   wherein the operation of the multi-vehicle system is controlled based on the signal that is received responsive to determining that the signal is received from the first vehicle that is in the multi-vehicle system and that the signal is not received from the second vehicle that is not in the multi-vehicle system.

4. The method of claim 1, further comprising:
   receiving a signal at the controlling vehicle from a first vehicle in the multi-vehicle system or a second vehicle that is not in the multi-vehicle system; and
   determining whether the location of the first vehicle or the second vehicle that sent the signal is located on a first route segment that the controlling vehicle also is located,
   wherein the operation of the multi-vehicle system is not controlled based on the signal that is received responsive to determining that the signal is received from the second vehicle that is not in the multi-vehicle system and that the signal is not received from the first vehicle that is in the multi-vehicle system.

5. The method of claim 1, wherein the locations that are received are relative locations of the vehicles that are relative to a moving reference point.

6. A control system comprising:
   a controller configured to be disposed onboard a controlling vehicle of a multi-vehicle system, the controller configured to receive vehicle makeup information from multiple other vehicles in the multi-vehicle system, the vehicle makeup information representing one or more characteristics of the other vehicles, the controller also configured to receive locations from location-determining devices respectively onboard the other vehicles in the multi-vehicle system determine a sequence of the other vehicles in the vehicle system using the locations that are received, and to control operation of the multi-vehicle system using a combination of the vehicle makeup information received from the other vehicles, the sequence of the other vehicles, and the locations of the other vehicles'
   wherein the controller is configured to determine a state of a first brake of the brakes in the multi-vehicle system, the controller also configured to control at least a second brake of the brakes in the multi-vehicle system based on the location of the first brake and based on the location of at least the second brake,
   wherein the controller is configured to determine that the second brake is disposed onboard a second vehicle of the other vehicles in the multi-vehicle system that is within a threshold distance from the first vehicle and to change engagement of the second brake based on the state of the first brake and the second vehicle being within the threshold distance from the first vehicle.

7. The control system of claim 6, wherein the controller is configured to determine a first radius of a curve of a path over which the multi-vehicle system extends using the locations of the other vehicles that are received, compare the first radius of the curve of the path over which the multi-vehicle system extends with a second curve of a route that is stored in a route database, and one or more of verify or modify the curve of the route that is stored in the route database based on comparing the first radius of the curve of the path with the second curve of the route.

8. The control system of claim 6, wherein the other vehicles include individually addressable brakes configured to be controlled by the controlling vehicle, and wherein the controller is configured to control the operation of the multi-vehicle system by controlling one or more of the brakes based on the locations of the other vehicles that are received.

9. The control system of claim 6, wherein the first brake is disposed onboard a first vehicle of the other vehicles in the multi-vehicle system and the state that is determined indicates that the first brake has failed.

10. The control system of claim 6, wherein the controller is configured to receive a signal at the controlling vehicle from a first vehicle in the multi-vehicle system or a second vehicle that is not in the multi-vehicle system and determine whether the location of the first vehicle or the second vehicle that sent the signal is located on a first route segment that the controlling vehicle also is located, the controller configured to control the operation of the multi-vehicle system based on the signal that is received responsive to determining that the signal is received from the first vehicle that is in the multi-vehicle system and that the signal is not received from the second vehicle that is not in the multi-vehicle system.

11. The control system of claim 6, wherein the locations that are received by the controller are relative locations of the vehicles that are relative to a moving reference point as the locations.

* * * * *